United States Patent
Ishihara et al.

(10) Patent No.: US 7,626,514 B2
(45) Date of Patent: Dec. 1, 2009

(54) SYSTEMS AND METHODS FOR REDUCING NUISANCE ALERTS FOR HELICOPTER ENHANCED GROUND PROXIMITY WARNING SYSTEMS

(75) Inventors: Yasuo Ishihara, Kirkland, WA (US); Charles D. Bateman, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 384 days.

(21) Appl. No.: 11/538,593

(22) Filed: Oct. 4, 2006

(65) Prior Publication Data

US 2007/0296612 A1    Dec. 27, 2007

Related U.S. Application Data

(60) Provisional application No. 60/805,719, filed on Jun. 23, 2006.

(51) Int. Cl.
*G08G 5/00*   (2006.01)

(52) U.S. Cl. .......... 340/959; 340/945; 340/961; 340/969; 340/970; 340/971; 244/75.1; 244/182; 701/7; 701/9

(58) Field of Classification Search ......... 340/959, 340/945, 961, 970, 971; 244/75 R, 75.1, 244/158 R, 182, 76 R; 701/9, 301, 4, 5, 7
See application file for complete search history.

(56) References Cited

U.S. PATENT DOCUMENTS

| | | | |
|---|---|---|---|
| 4,551,723 A | | 11/1985 | Paterson |
| 4,980,684 A | | 12/1990 | Paterson et al. |
| 6,437,707 B1 | * | 8/2002 | Johnson ............ 340/959 |
| 6,583,733 B2 | | 6/2003 | Ishihara et al. |
| 6,745,115 B1 | * | 6/2004 | Chen et al. ........... 701/9 |
| 6,828,921 B2 | * | 12/2004 | Brown et al. ......... 340/945 |
| 2004/0181318 A1 | * | 9/2004 | Redmond et al. ........ 701/9 |

* cited by examiner

*Primary Examiner*—Davetta W Goins

(57) ABSTRACT

Systems and methods for controlling activation of a look-ahead function of a terrain alert and warning system. The system receives rate of climb and aircraft speed information, compares the rate of climb and aircraft speed information to a predefined threshold, and deactivates a look-ahead function based on the comparison.

14 Claims, 3 Drawing Sheets

SYSTEMS AND METHODS FOR REDUCING NUISANCE ALERTS FOR HELICOPTER ENHANCED GROUND PROXIMITY WARNING SYSTEMS

PRIORITY CLAIM

This application claims the benefit of U.S. Provisional Patent Application Ser. No. 60/805,719 filed Jun. 23, 2006, the contents of which are hereby incorporated by reference.

BACKGROUND OF THE INVENTION

Current helicopter Enhanced Ground Proximity Warning System (EGPWS) look-ahead functionality is deactivated at or below 70 kts aircraft speed to reduce the number of nuisance alerts during takeoff and landing. However, the best rate of climb speed for many helicopters is at an air speed of less than 70 kts, which means during an escape maneuver at the best rate of climb speed, the helicopter EGPWS may not be activated.

Therefore, there exists a need for an improved cutoff method to provide more protection at low speed while still preventing nuisance alerts.

SUMMARY OF THE INVENTION

The present invention provides systems and methods for controlling activation of a look-ahead function of a terrain alert and warning system. The system receives rate of climb and aircraft speed information, compares the rate of climb and ground speed or air speed information to a predefined threshold, and deactivates a look-ahead function based on the comparison.

In one aspect of the invention, deactivation includes inhibiting output of at least one of a caution or warning signal produced by the look-ahead function.

In another aspect of the invention, the predefined threshold is defined by any aircraft speed greater than the threshold aircraft speed and a rate of climb that is greater than at least one of a straight sloped line or a curve defined by limits of a first rate of climb at 0 kts aircraft speed and a second rate of climb at a threshold aircraft speed.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
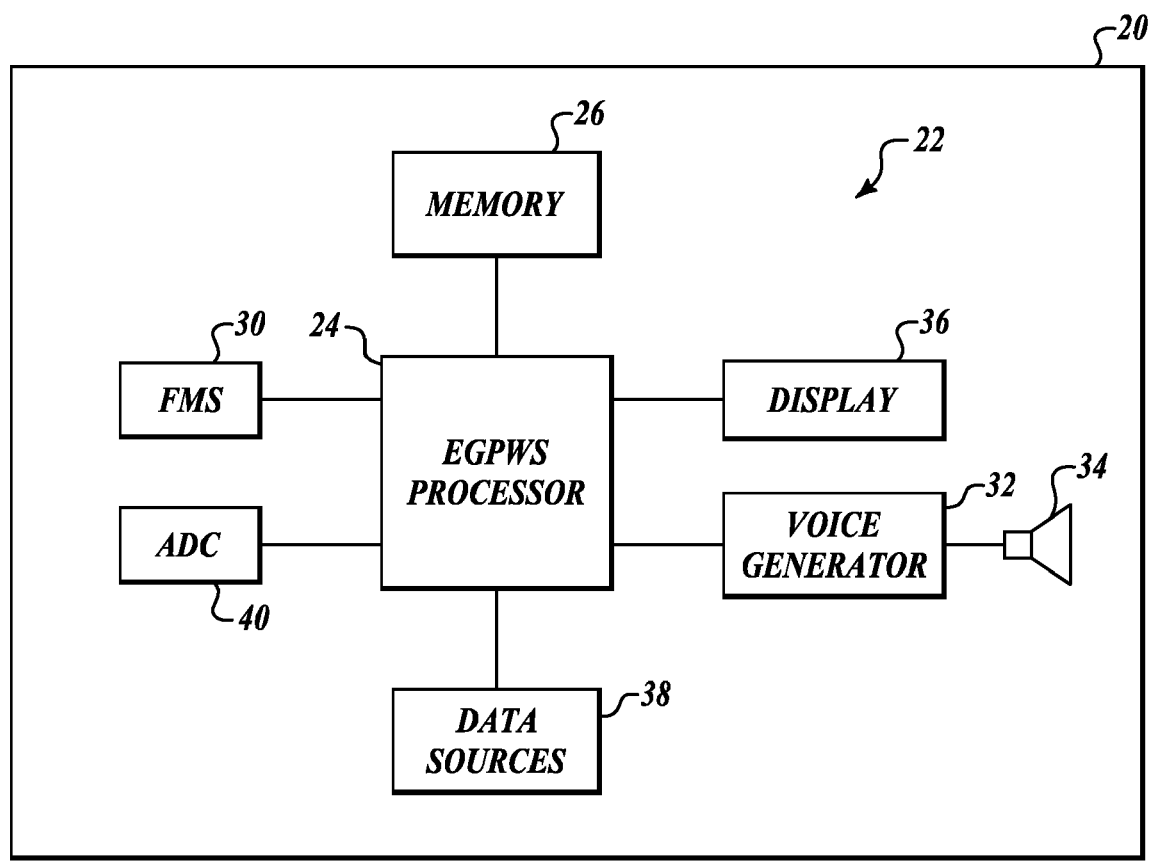
FIG. 1 illustrates a schematic block diagram of an example system formed in accordance with an embodiment of the present invention.

FIG. 1 illustrates an example system 22 embodied within a rotary wing aircraft 20 for improving the effectiveness of a look-ahead function of an Enhanced Ground Proximity Warning System (EGPWS). The system 22 includes a processor 24, such as a Terrain Alert and Warning System (TAWS) (e.g., EGPWS), memory 26, a Flight Management System (FMS) 30, multiple other data sources 38, a voice generator 32, one or more speakers 34, and one or more displays 36. The processor 24 is in data communication with the memory 26, the voice generator 32, the displays 36, the FMS 30, and/or the other data sources 38. Examples of the other data sources 38 include, but are not limited to, a Global Positioning System (GPS) and a pitot-static system.

The processor 24 compares terrain and/or obstacle data that is stored within the memory 26 with one or more look-ahead envelopes based on various data received from an Air Data Computer (ADC) 40, and/or any of the other data sources 38. Example look-ahead envelopes and comparison to stored obstacle and terrain data are described in U.S. Pat. No. 6,583,733, which is hereby incorporated by reference. If conflicts occur between the created envelopes and any of the stored data based on the comparison, the processor 24 outputs caution or warning alerts via the displays 36 or the speakers 34 via the voice generator 32.

The processor 24 deactivates the comparison of the look-ahead envelopes with the stored data or deactivates any caution or warning alerts produced by the comparison of the look-ahead envelopes to the stored data, if the rate of climb of the rotary aircraft 20 at the current aircraft (ground or air) speed of the aircraft 20 is less than a threshold value. Rate of climb information and aircraft speed information comes from any of a number of sources, such as the ADC 40, or the other data sources 38. Examples of thresholds in relation to the rate of climb and aircraft speed are shown in FIGS. 3 and 4 and described below.

Figure 2:
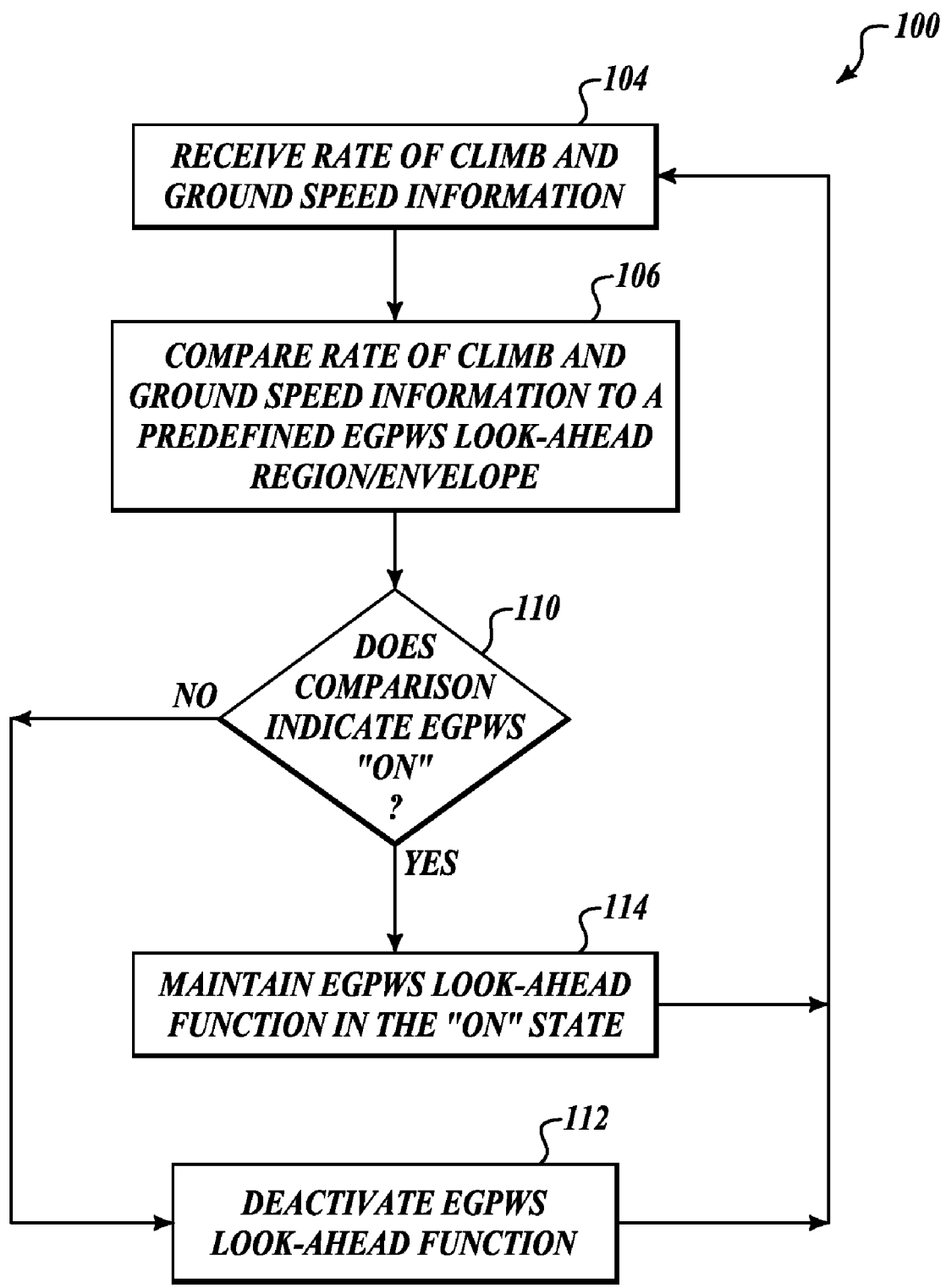
FIG. 2 illustrates an example process performed by one or more components of the system shown in FIG. 1.

FIG. 2 illustrates an example process performed by the processor 24 for enhancing EGPWS functionality when the rotary aircraft 20 is in a climbing situation. First, at a block 104, the processor 24 receives rate of climb and aircraft speed information from any of the number of sources. In one embodiment, the processor 24 may include functionality for computing the rate of climb or the aircraft speed based on the data received. Next, at a block 106, the processor 24 compares the received or computed rate of climb and aircraft speed information to a pre-defined threshold or look-ahead On-region using a predefined algorithm, such as is shown in the threshold charts of FIGS. 3 and 4 for example. The threshold chart/algorithm indicates when a look-ahead function of the EGPWS is maintained in an On-state. At a decision block 110, if the comparison performed at the block 106 does not indicate that the rate of climb and aircraft speed information are located within the look-ahead On-region, then at a block 112, the look-ahead function is deactivated or the output of any caution or warning alerts produced by the look-ahead function is suppressed and not outputted to the displays 36 or the speakers 34. If, at the decision block 110, the rate of climb and aircraft speed information are within the look-ahead On-region, then at block 114, the look-ahead function is maintained in an On-state (or activated if previously deactivated). Caution or warning alerts that may be produced by processor 24 as they relate to the look-ahead function are not suppressed and thus would be outputted to the displays 36 or the speakers 34 via the voice generator 32.

Figure 3:
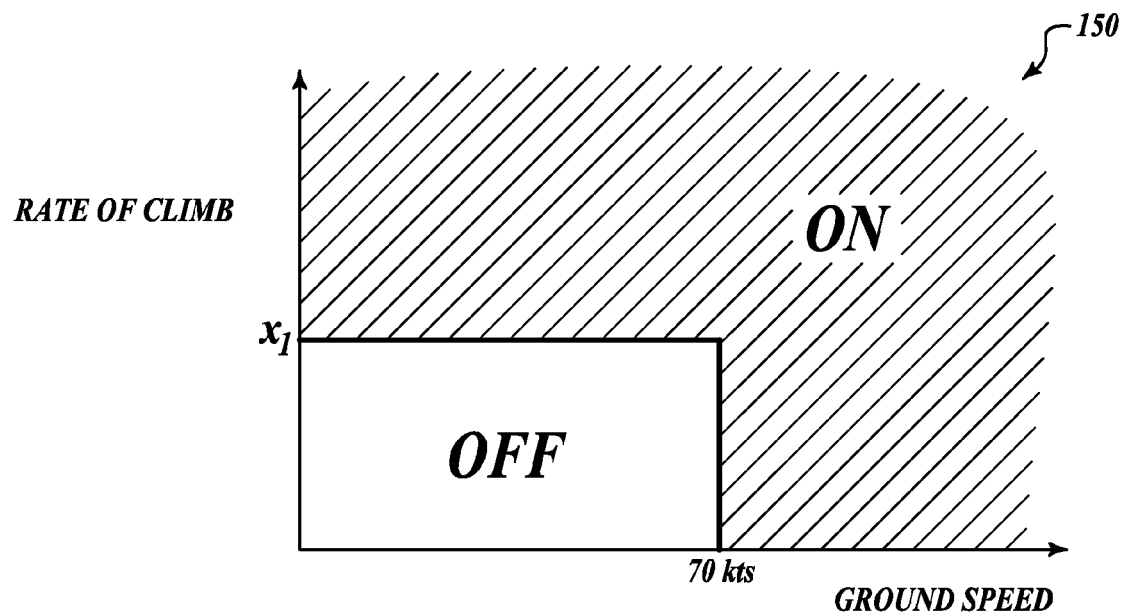
FIGS. 3 and 4 illustrate example threshold graphs as used during a comparison step of the example process shown in FIG. 2.

FIG. 3 illustrates a first graph 150 that presents a modified threshold comparison for whether the processor 24 deactivates the look-ahead function or suppresses caution or warning alerts that would be produced by the look-ahead function. In this example, the look-ahead function remains active if the aircraft speed is above a threshold aircraft speed (for example 70 kts) or the rate of climb is above a threshold rate-of-climb ($X_1$). In one embodiment, the value of $X_1$ is approximately 500 feet per minute, but may be of any value as desired by the aircraft operator. Also, the threshold aircraft speed may be set at different values depending upon the desires of the aircraft operator.

Figure 4:
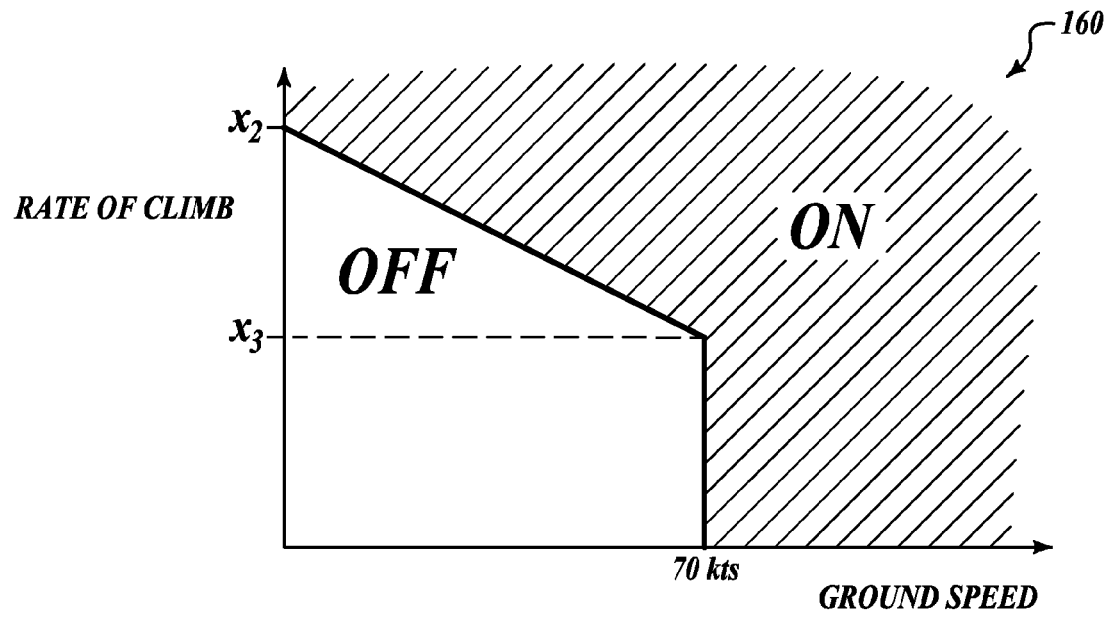

FIG. 4 illustrates another threshold graph 160. The graph 160 shows that the On-region for the look-ahead function is defined by any aircraft speed above a threshold, such as 70 kts and above a pre-defined slope line that starts at a first rate of climb ($X_2$) and drops down to a second rate of climb ($X_3$) at the aircraft speed threshold (e.g., 70 kts). Therefore, if the graph 160 is used, then the look-ahead function is deactivated or similarly the caution or warning alerts produced by the look-ahead function are deactivated, if the aircraft's speed is less than the threshold speed (70 kts and the rate of climb is below the line defined by rate of climb $X_2$ at 0 kts and $X_3$ at 70 kts). In one embodiment, $X_3$ is approximately 200 feet/minute and $X_2$ is approximately 500 feet/minute or greater. Other $X_2$ and $X_3$ values may be used for defining the threshold rate of climb. Also, the line between $X_2$ and $X_3$ may have a curve shape, may be stepped or may be a combination of straight and curved.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for controlling activation of a look-ahead function of a terrain alert and warning system, the method comprising:
   receiving aircraft rate of climb and aircraft speed information;
   comparing at least one of the rate of climb and aircraft speed information to a threshold defined by any aircraft speed greater than a threshold aircraft speed and a rate of climb that is greater than at least one of a straight sloped line or a curve defined by a first rate of climb at 0 kts aircraft speed and a second rate of climb at the threshold aircraft speed; and
   setting an operating state of a look-ahead function based on the comparison.

2. The method of claim 1, wherein setting includes setting includes inhibiting output of at least one of a caution or warning signal produced by the look-ahead function.

3. The method of claim 1, wherein setting includes setting the operating state as active if the comparison indicates that the rate of climb is at least 500 feet per minute.

4. The method of claim 3, wherein setting includes setting the operating state as active if the aircraft speed is at least 70 kts.

5. The method of claim 1, wherein the first rate of climb is 500 feet per minute.

6. The method of claim 1, wherein the second rate of climb is 200 feet per minute.

7. The method of claim 6, wherein the threshold aircraft speed is 70 kts.

8. A system for controlling activation of a look-ahead function of a terrain alert and warning system, the system comprising:
   one or more flight information sources for generating rate of climb and aircraft speed information;
   a processing device in communication with the one or more flight information sources configured to:
      receive aircraft rate of climb and aircraft speed information;
      compare at least one of the rate of climb and aircraft speed information to a threshold defined by any aircraft speed greater than a threshold aircraft speed and a rate of climb that is greater than at least one of a straight sloped line or a curve defined by a first rate of climb at 0 kts aircraft speed and a second rate of climb at the threshold aircraft speed; and
      set an operating state of the look-ahead function based on the comparison.

9. The system of claim 8, wherein the processing device inhibits output of at least one of a caution or warning signal produced by the look-ahead function.

10. The system of claim 8, wherein the processing device sets the operating state of the look-ahead function as active if the rate of climb is at least 500 feet per minute.

11. The system of claim 10, wherein the processing device sets the operating state of the look-ahead function as active if the aircraft speed is at least 70 kts.

12. The system of claim 8, wherein the first rate of climb is 500 feet per minute.

13. The system of claim 12, wherein the second rate of climb is 200 feet per minute.

14. The system of claim 13, wherein the threshold aircraft speed is 70 kts.

* * * * *

UNITED STATES PATENT AND TRADEMARK OFFICE
CERTIFICATE OF CORRECTION

| | | |
|---|---|---|
| PATENT NO. | : 7,626,514 B2 | Page 1 of 1 |
| APPLICATION NO. | : 11/538593 | |
| DATED | : December 1, 2009 | |
| INVENTOR(S) | : Ishihara et al. | |

It is certified that error appears in the above-identified patent and that said Letters Patent is hereby corrected as shown below:

In Col. 3, Claim 2, please delete duplicate words "setting includes"

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,626,514 B2  Page 1 of 1
APPLICATION NO. : 11/538593
DATED : December 1, 2009
INVENTOR(S) : Ishihara et al.

It is certified that error appears in the above-identified patent and that said Letters Patent is hereby corrected as shown below:

In Col. 3, Claim 2, line 44, please delete duplicate words "setting includes"

This certificate supersedes the Certificate of Correction issued March 30, 2010.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,626,514 B2  Page 1 of 1
APPLICATION NO. : 11/538593
DATED : December 1, 2009
INVENTOR(S) : Ishihara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Second Day of November, 2010

David J. Kappos
*Director of the United States Patent and Trademark Office*